W. L. DUNN.
STEAM GENERATOR FOR COOKING PURPOSES.
APPLICATION FILED SEPT. 26, 1908.
963,695.
Patented July 5, 1910.
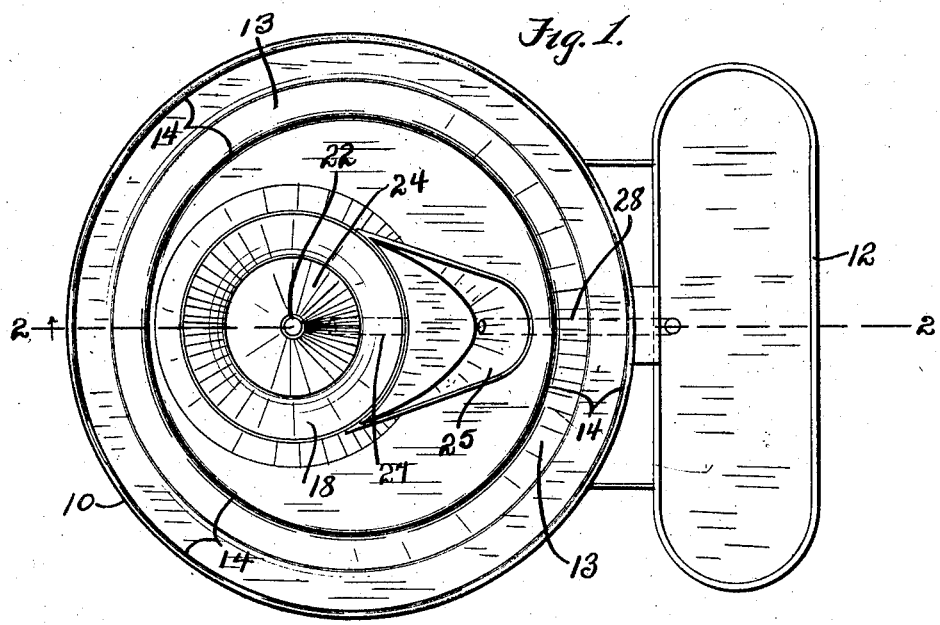
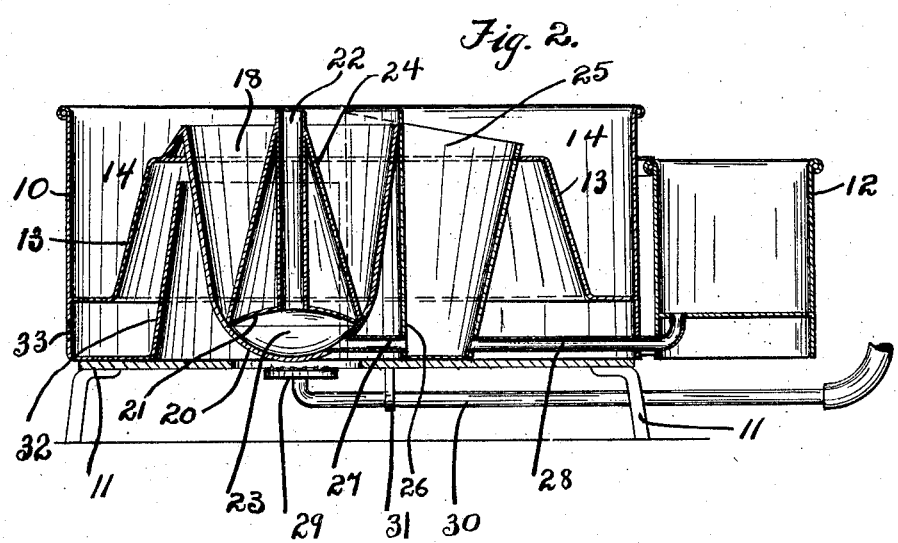
Witnesses:
Inventor:
William L. Dunn
by Lynch & Dorr
Attorneys.

UNITED STATES PATENT OFFICE.

WILLIAM L. DUNN, OF CLEVELAND, OHIO.

STEAM-GENERATOR FOR COOKING PURPOSES.

963,695.   Specification of Letters Patent.   Patented July 5, 1910.

Application filed September 26, 1908. Serial No. 454,884.

*To all whom it may concern:*

Be it known that I, WILLIAM L. DUNN, a citizen of the United States of America, residing at Cleveland, in the county of Cuyahoga and State of Ohio, have invented certain new and useful Improvements in Steam-Generators for Cooking Purposes; and I hereby declare the following to be a full, clear, and exact description of the invention, such as will enable others skilled in the art to which it pertains to make and use the same.

This invention relates to steam generators or so-called steamers for cooking purposes.

One of the objects of the invention is the provision of a steam generator which is economical in the gas or fuel required for its use or operation.

A further object is the provision of a steam generator having a large area and which is adapted to be supplied with water heated and maintained at a steaming temperature by a small flame or the like.

A further object is the provision of a steam generator having means for automatically supplying water to the steamer proper to replace the water evaporated so as to maintain a constant quantity in the steamer proper so long as any water remains in the source of supply.

A further object is the provision of a steam generator having means for supplying fresh water to the steamer proper to take the place of the water evaporated in a manner such that the temperature of the water in the steamer proper is not perceptibly lowered.

A further object is the provision of a steam generator which is more efficient than the devices heretofore employed.

A still further object is the provision of a steam generator which may be adapted for supplying steam to advantage in connection with any of the known steam cookers or devices for cooking by steam.

My invention also consists in certain novel details of construction and combinations and arrangements of parts which will be described in the specification and set forth in the appended claims and illustrated in the preferred form in the accompanying drawing.

Reference is had to the accompanying drawings in which—

Figure 1 is a plan view of the steam generator or steamer constructed in accordance with my invention, and Fig. 2 is a vertical sectional view of the same.

Referring now to the figures of the drawings 10 represents the main casing or body of the steam generator or steamer which is supported on a frame 11 and which in this case is cylindrical and is provided with an open top, and 12 represents a reservoir which is supported at the side of the casing 10 and is adapted to contain the water that is automatically supplied to the generator proper. The generator proper is provided intermediate the upper and lower ends thereof with a partition or bottom 13 which forms with the casing 10 the main steaming compartment 14. The shape of this partition or bottom 13 may be varied, but in the present case it is provided with a lower horizontal portion and an upwardly and inwardly tapered or inclined portion and an upper horizontal portion.

Located within the casing 10 and extending through the upper horizontal portion of the partition 13 is a hot water well 18 having an open circular top which is located preferably a short distance above the upper horizontal portion of the partition 13. The well 18 has a conical shaped body and a rounded bottom shown at 20 which is located at the lower portion of the casing. Secured within the well 18 and near the bottom thereof is a disk-like partition 21 provided at its top with an opening in which is secured the lower end of an open vertical tube or pipe 22, the upper end of which preferably extends a short distance above the upper edge of the well 18. This partition 21 forms with the rounded bottom 20 of the well 18 the main heating compartment 23, and the open tube 22 forms the outlet pipe for conveying the hot water and steam from the main heating compartment 23 to the steaming compartments which include the chamber 14, the well 18 and the chamber 25 hereinafter described. The tube 22 is surrounded by a cone shaped casing 24, the upper portion of which is secured to the tube 22 near its upper end, and the bottom of which is secured to the inner wall of the well 18 adjacent the periphery of the disk-like partition 21. This casing 24 not only supports the outlet pipe 22 but forms an air inclosure or jacket for the pipe 22 for a purpose to be presently referred to. Also extending through the upper horizontal portion 17 of the partition 13 at one side of and adjacent the well 18, is a second hot water chamber 25 which may also be called the mixing chamber as both the heated water and the fresh supply of cold water pass through said chamber before entering the heating compartment having an open top. This chamber 25 is provided on the side adjacent the well 18 with a cylindrical portion 26 which, as shown most clearly in Fig. 2, extends a short distance above the top of the well 18 and engages the upper edge of the latter for a portion of its circumference. From the upper corners of the cylindrical portion the top tapers downwardly and converges slightly so that the lowest and narrowest portion of the top edge is below the upper edge of the well 18. As will be brought out later, this point determines the depth of the water in the main steaming compartment 14. The bottom of this chamber 25 is connected with the main heating compartment 23 by means of a short tube or pipe 27, and is connected to the reservoir 12 by a tube or pipe 28, the latter extending upward through the bottom of the reservoir.

Any suitable means may be provided for heating the water in the steam generator and to accomplish the same the generator may be set on any regular cooking stove or range, but in the present instance I have shown the generator equipped with a gas burner 29 which is located directly below the round bottom of the well 18 and consequently below the heating compartment 23. This burner is connected to a gas supply pipe 30 which may be supported from the frame by one or more brackets 31.

Located beneath the partition 13 and partially surrounding the well 18 is a heat deflecting plate 32 which is attached to the bottom of the main casing 10 and tapers slightly inwardly toward the wall of the well 18. The purpose of this deflector is, as will be brought out more fully, to cause the heat from the flame at the burner to pass upward around the well 18, the upper edge of the deflector being spaced a short distance from the well 18, and then to pass downward between the deflector and the tapered portion of the partition 13 and to escape through suitable openings one of which is shown at 33 near the bottom of the casing.

The purpose or function of the various parts of the generator and its mode of operation will now be explained.

To fill the generator water will be supplied directly to the reservoir, to the well 18 and to the steaming compartment 14. The water from the reservoir will of course pass directly to the chamber 25, the main heating compartment 23 and the tube 22 and will of course stand at the same level in the tube 22 and in the chamber 25 as it does in the reservoir. When heat is applied to the lower side of the heating compartment 23 by igniting the gas at the specially provided burner here shown, or by applying heat thereto in any other manner, heated water and steam will rise upward in the tube 22 and flow into the hot water well 18, and in a short space of time will flow over the top edge of this chamber into the main steaming compartment 14, the water being automatically supplied to the heater proper 23 from the reservoir to replace the water which is forced out through the upper end of the tube 22. When the water rises to a sufficient height in the compartment 14, it will flow into the chamber 25, and then a continuous circulation of hot water will be maintained from the heating compartment 23 up through the tube 22 into the well 18, out into the compartment 14, around both sides of the upper portions of the chamber 25 and well 18 to the portion of the compartment 14 adjacent the reservoir 12, thence over the top edge of the chamber 25 into the latter, and thence by tube or pipe 27 again into the heating compartment 23, the direct flow of water from the well 18 into the chamber 25 being prevented since the wall of the chamber 25 adjacent the well 18 extends above the latter. The steaming surface includes the surface of the water in the compartments 14, 18 and 25, and the water is maintained at nearly the same temperature in all parts of these compartments by the circulation which takes place continuously as long as there is any water in the reservoir 12, it being understood that water is supplied automatically from the reservoir to replace the water which is evaporated, and that the quantity of water in the generator proper will remain constant as long as there is any water in the reservoir.

The well 18 and chamber 25 extend below the bottom of the reservoir 12 so that there will still be water in the heating compartment 23 after the reservoir is empty.

It will be seen that not only is the water heated in the compartment 23 by the direct application of the flame to the bottom thereof, but as the heat rises it also raises the temperature of the water which is in the well 18 and surrounds the conical casing 24, thus this portion of the well 18 serves as a secondary heating compartment. The conical casing 24 which surrounds the tube 22 keeps the water which has passed from the tube into the well 18 and which may be at a lower temperature than the water in the tube, out of contact with the outer surface of the tube and prevents the temperature of the water therein from being lowered. It will be seen also that the cylindrical portion 26 of the chamber 25 as well as the deflector 32 guide the heated air upward in contact with the wall of the well 18 before it passes out of the main casing 10 through the outlet opening or openings 33.

I do not desire to be confined to the exact details shown, but aim in my claims to cover all modifications which do not involve a departure in the spirit and scope of my invention.

What I claim is,—

1. In combination, in a steam generator for cooking purposes, a main casing having a steam compartment adapted to contain hot water, a closed water heating compartment communicating with said steam compartment and a mixing chamber communicating at its upper end with said steam compartment and at its lower end with said heating compartment and means for supplying a fresh quantity of water to said mixing chamber to take the place of the water evaporated in the steam compartment.

2. In combination, in a steam generator for cooking purposes, a main casing having a steam compartment adapted to contain water, a closed water heating compartment, a tube connecting said heating compartment and said steam compartment and a mixing chamber communicating with said steam compartment and with said heating compartment, said mixing chamber being provided with means for receiving the new supply of water to take the place of the water evaporated in the steam compartment.

3. In combination, in a steam generator for cooking purposes, a main casing having a steam compartment adapted to contain hot water, a closed water heating compartment below the steam compartment, an open tube or pipe extending upward from the heating compartment to the steam compartment, a mixing chamber communicating with the steam compartment at its upper end so that hot water from the steam compartment may flow into the same a pipe connecting the bottom of said mixing chamber with said heating compartment, a reservoir and a pipe connecting said reservoir and said mixing chamber.

4. In combination, in a steam generator for cooking purposes, a main casing having an open top and a partition forming a steam compartment, a well having an open top above said partition and having at the bottom a closed water heating compartment, an open tube extending upward from said heating compartment above said partition, a mixing chamber having an open top likewise above said partition and into which water is adapted to flow from said steam compartment, said mixing chamber being in open communication at its lower end with said heating compartment.

5. In combination, in a steam generator for cooking purposes, a main casing or receptacle having an open top and a partition forming a steam compartment, a well having an open top extending above said partition and having at the bottom a heating compartment, an open tube extending upward from said heating compartment above said partition, a mixing chamber having an open top likewise extending above said partition and into which hot water is adapted to flow from said steam compartment, said mixing chamber being connected at the bottom to the heating compartment and a reservoir connected to said mixing chamber and adapted to supply water thereto.

6. In combination, in a steam generator for cooking purposes, a main outer casing having intermediate the upper and lower ends thereof a dividing partition forming a main steam compartment, a hot water well provided with an open top which is above said dividing partition and having an inwardly inclined body portion, a main heating compartment at the bottom of said well, a centrally located vertical tube extending upward from said heating compartment and adapted to supply hot water to said hot water well and to said steam compartment, a mixing chamber having a portion of its wall adjacent to the well extending above and partially surrounding the top edge of the well and the upper edge of the mixing chamber being inclined downward away from the well and at its lowest point being below the top of the well whereby water may flow into the mixing chamber and a pipe connecting the lower portion of said mixing chamber with the heating compartment.

7. In combination, in a steam generator for cooking purposes, a main outer casing having intermediate the upper and lower ends thereof a dividing partition forming a main steam compartment, a hot water well provided with an open top which is above said partition and having an inclined body portion extending below the well, a main heating compartment at the bottom of said chamber, a centrally located vertical tube extending upward from said heating compartment and adapted to supply hot water to said hot water well and to said main steam compartment, a mixing chamber, a portion of the wall of said mixing chamber which is adjacent the well partially surrounding and being above the top edge of the well, and the upper edge of said mixing chamber being inclined downward away from the well and at its lowest point being below the top of the well whereby hot water may flow into the same, a pipe connecting the lower portion of said mixing chamber with the heating compartment of the well and a reservoir connected to said mixing chamber and adapted to supply water to replace the water which is evaporated in the steam compartment.

8. In combination, in a steam generator for cooking purposes, a main casing having a steam compartment adapted to contain hot water, a closed water heating compartment below the steam compartment, an open pipe extending upward from the heating compartment to the steam compartment, a mixing chamber communicating at its upper end with the steam compartment and at its lower end with the heating compartment and a reservoir communicating with said mixing chamber.

In testimony whereof, I sign the foregoing specification, in the presence of two witnesses.

WILLIAM L. DUNN.

Witnesses:
W. G. HILDEBRAN,
VICTOR C. LYNCH.